United States Patent
Sukenik

Patent Number: 6,074,507
Date of Patent: Jun. 13, 2000

[54] CORRUGATING ROLL WITH IMPROVED FLUTE PROFILE

[75] Inventor: Robert A. Sukenik, Knoxville, Tenn.

[73] Assignee: Corrugating Roll Corporation, Knoxville, Tenn.

[21] Appl. No.: 09/005,353

[22] Filed: Jan. 9, 1998

[51] Int. Cl.[7] ........................................................ B31F 1/22
[52] U.S. Cl. ...................... 156/205; 156/210; 156/462; 156/472; 428/183
[58] Field of Search ..................... 428/183, 184, 428/186; 264/286; 156/205, 210, 462, 470, 472; 425/336, 339; 72/196; 492/30, 36; 493/463

[56] References Cited

U.S. PATENT DOCUMENTS

| | | |
|---|---|---|
| 512,651 | 1/1894 | Goldsmith . |
| 2,059,292 | 11/1936 | Taylor . |
| 2,160,677 | 5/1939 | Romanoff ............................... 428/183 |
| 2,176,956 | 10/1939 | Cook et al. . |
| 2,258,443 | 10/1941 | Bruker ................................. 425/369 |
| 3,053,309 | 9/1962 | Wilson et al. . |
| 3,300,359 | 1/1967 | Nikkel . |
| 3,495,468 | 2/1970 | Griffel . |
| 4,101,367 | 7/1978 | Maier . |
| 4,154,565 | 5/1979 | Hyde et al. . |
| 4,306,932 | 12/1981 | Bradatsch et al. . |
| 4,319,473 | 3/1982 | Franke, Jr. et al. . |
| 4,487,088 | 12/1984 | Olson . |
| 5,096,407 | 3/1992 | Nebeling . |
| 5,160,556 | 11/1992 | Hyde et al. . |
| 5,180,448 | 1/1993 | Hyde et al. . |
| 5,389,183 | 2/1995 | Seki et al. . |
| 5,509,288 | 4/1996 | Ohno et al. ............................... 72/196 |

FOREIGN PATENT DOCUMENTS 0 696 648 A1  2/1996  European Pat. Off. .

Primary Examiner—Michael W. Ball
Assistant Examiner—Gladys Piazza
Attorney, Agent, or Firm—Luedeka, Neely &Graham P.C

[57] ABSTRACT

Corrugating rolls for forming corrugated paperboard medium are given a flute valley profile having a narrow channel along the valley base between arcuate segments of the valley base that parallel the channel on opposite sides of a radial plane of symmetry. This valley base channel is of such depth as to relieve the fiber compression stress between cooperatively nipping flute tip and valley surfaces along the axial plane between respective corrugating rolls. One advantage of the invention is to increase the on-line time of plated rolls by limiting accelerated wear of the plating in the valley base channels of the rolls. The invention also provides an improved corrugating medium characterized by flute tips which are relatively less compressed as compared to adjacent flanking regions.

16 Claims, 6 Drawing Sheets

CORRUGATING ROLL WITH IMPROVED FLUTE PROFILE

BACKGROUND OF THE INVENTION

The present invention relates generally to improvements in paper corrugating machinery. More particularly, the invention relates to a corrugating method and an improved flute profile for meshing corrugating rolls.

The basic assembly of corrugated paperboard comprises a sinusoidly undulating web that is adhesively laminated between two, oppositely facing flat webs. The undulating web is characterized as the corrugated medium or, alternatively, simply as the "medium". The two flat facing webs are characterized as liners. The undulations of the medium are called flutes. Respective to one side of the corrugated medium, the flutes are profiled between tips and valleys, alternately. The tip of one side of the medium constitutes a flute valley for the other side of the medium.

The corrugated medium is formed in a meshing nip between two corrugating rolls. These corrugating rolls are a matched pair of cylinders rotating about respective axes. Either or both may be directly driven. The surfaces of these cylinders have a fluted profile in a manner similar to meshing gears. An undeformed paper web is routed into the meshing nip between two rotating corrugating rolls. In the vicinity of the axial plane respective to these two rolls, the web fibers are deformed by a compressive or mildly crushing nip between the flute tip of one corrugating roll and the flute valley of the cooperating roll. This compression along the flute tip gives the web a permanently arced contour.

As the fluted medium emerges from the contour forming nip, it is held tightly to the fluted surfaces of one of the rolls by pressure, vacuum or by crescent shaped guide fences called "fingers" as it continues around an additional rotational arc about the roll axis into nipped convergence with a first liner web between the smooth surface of a pressure roll or belt and the passing flute tips of the corrugated medium. In route to the convergent nip, adhesive is applied to the medium flute tips. The line of contact along the axial plane between the pressure roll or belt and the corrugating roll provides significant compressive contact force between the liner web and the corrugated medium tips to induce an initial setting of an adhesive bond between them. The laminated product resulting from this compressive contact is characterized as single-face board and the aforedescribed machinery for producing it is characterized as the single-facer.

With respect to the compressive pressure applied to the corrugated medium web along the axial plane between the two corrugating rolls, the meshing flute tip and valley profiles are generally configured as partial arcs of concentric circles. The arc of such a partial circle is generally in the order of 40° to 60°. The circle radius is determined by the flute size. The clearance between the flute tip surface and the cooperating flute valley surface is in the order of 20 to 40 percent less than the thickness of the medium web. As a term of art, a web thickness dimension is often characterized as "caliper". Hence, a mildly compressive crush of the medium or a decrease in caliper occurs along this circular arced nip space between a flute tip and valley.

The material substance of corrugating medium paperboard is usually quite abrasive. Normally, it is the product of a high yield pulping process controlled to remove only about half of the naturally present lignin. Such high yield pulp usually receives only minimal cleaning and dirt removal. Additionally, high yield medium pulp is often supplemented with the fiber rejects from other paper products and pulp additives consisting of drainage and formation aids which can include highly abrasive particles.

Since the meshing nip between flutes of a pair of corrugating rolls is not a true involute and occurs via co-rotating motion of rolls in compression, the compressive web contact between a meshing flute tip and valley necessarily includes a degree of wiping or sliding motion between the medium web and the merging and diverging flute surfaces. In combination with the nip compression force and the abrasiveness of the medium web, this sliding between adjacent meshing corrugating roll flute tips and valleys is a significant source of roll material loss due to abrasion. When the degree of roll material loss along the flute tips and valleys progresses to the point that unacceptable product is produced, the corrugating rolls must be replaced.

In the overall, a corrugating roll is a highly complex machine element of considerable capital value. The quantity of structural material lost by abrasion is extremely small, both in area and in mass. Hence, it is a standard practice to hard-face or plate the roll surfaces with a relatively thin layer of tungsten carbide or electroplated chrome. These extremely hard surface coatings extend the operational life of a roll by slowing the rate of wear. Moreover, hard-facing facilitates roll recycling by known reconditioning processes. When a plated roll wears out, the coating is chemically removed and the metal value recovered. The chemically stripped roll is then resurfaced as new.

Within the fiber compressing nip between mating flute tips and valleys, the wear rate is greatest along the axial plane of tip and valley symmetry. However, electrolytically applied metal coatings often do not distribute uniformly onto small radius convex and concave surfaces. Corrugating roll flute valleys may receive a thinner protective coat of chrome or electrically deposited hard-face material along the axial plane than do the flute tips. Accordingly, the thickness of a flute valley coating is often the limiting factor in concluding a corrugating roll production cycle before reconditioning the roll surface.

It is, therefore, an object of the present invention to extend the operating life of a corrugating roll.

Another object of the present invention is to increase the electroplate deposition thickness along corrugating roll flute valleys which can be sustained during use before a roll has to be taken off line and replated.

An additional object of the invention is to provide an improved corrugating roll nip profile.

A further object of the invention is to provide a new corrugating process that results in a reduced rate of machinery wear.

A still further object of the invention is a corrugating machine that provides a more consistent corrugated board caliper over the productive life cycle of the machine.

It is also an object of the invention to provide a corrugated board product with improved properties including, but not limited to, improved adherence between the corrugating medium and the adjacent liner or liners and improved compressive strength.

SUMMARY OF THE INVENTION

These and other objects of the invention as will subsequently become apparent from the following description of the preferred embodiments are accomplished by a pair of corrugating rolls having undulating surface flutes with rotatively meshing tips and valleys. The flute tips and valleys are substantially contoured about radial planes of symmetry. Each valley base surface is a substantially radial arc. The continuity of the arc profile is interrupted along the plane of symmetry by a narrow trough. Boundaries of the trough are on opposite sides of the respective plane of symmetry thereby dividing the valley base area into a pair of axially elongated radial base arcs separated by the elongated trough. Accordingly, this trough is a relatively narrow strip along of the valley plane of symmetry and is of such radial depth as to exert reduced compressive force upon a medium web. The width of the valley trough may be from about 10 percent to about 50 percent of the valley base arc.

A separation distance between a meshing flue tip and valley nip is calibrated to compress the fiber constituency of medium drawn into the nip. For each meshed engagement, between a tip and valley, two relatively narrow, substantially parallel line areas of fibers are compressed between the tip and the axially elongated valley base arc. These parallel line areas of compressed fiber are separated by an area of fibers comparatively less compressed corresponding to the trough in the valley base arc. Resultantly, each tip/valley flute line compressed into the medium web becomes two parallel narrow lines separated by a narrow line of material that is compressed to a lesser degree than the material on its opposing sides.

Preferably, the trough boundaries are given a faired, convex contour in transition with the adjacent valley base arc surfaces. This convex contour is receptive to a greater deposition thickness of electroplated hard-facing and, together with the relatively increased separation between the tip and valley of adjacent meshing rolls along the axial plane, extends the operational life of a corrugating roll before it has to be taken off line and replated.

BRIEF DESCRIPTION OF THE DRAWINGS

The preferred embodiments of my invention will now be described in detail as follows and with reference to the drawings in which.

DESCRIPTION OF THE PREFERRED EMBODIMENTS

Figure 1:
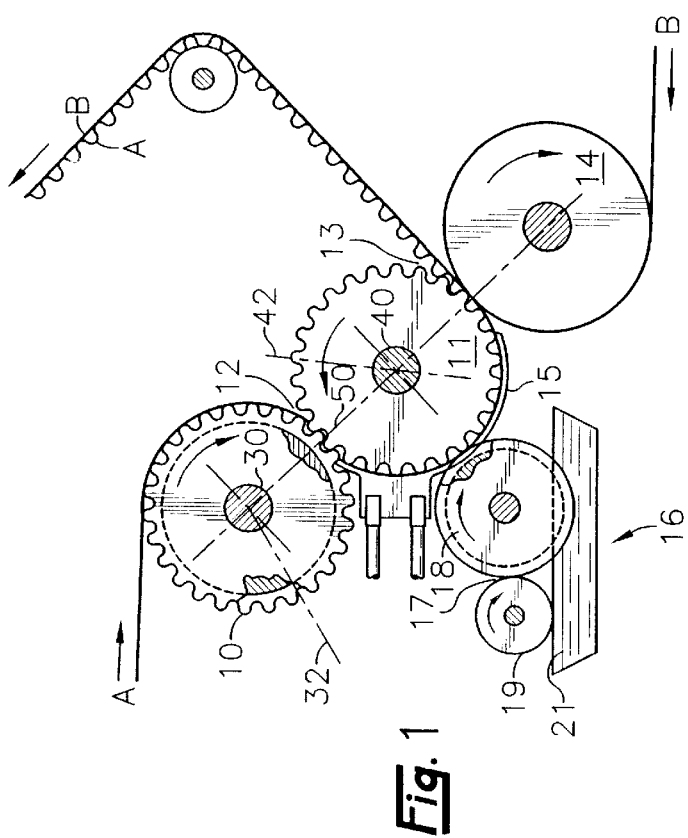
FIG. 1 is a schematic elevational view of a corrugating machine single facer.

Relative to the drawings wherein reference characters are used among the several figures of the drawings to designate the same or similar elements of the invention, FIG. 1 illustrates a corrugating machine single facer comprising a pair of corrugating rolls 10 and 11 rotating about respective axes 30 and 40. The roll surface flutes mesh in a nip 12 through which the corrugating medium A passes. The medium A travels with the circumference of the corrugating roll 11 into the nip 13 with a pressure roll 14. A bank of stripper fingers 15 are spaced around the portion of the corrugating roll 11 that contiguously carries the medium A. These stripper fingers 15 hold the corrugated medium A firmly against the fluted surface of a corrugating roll 11.

An adhesive applicator assembly 16 comprises a nip 17 between an adhesive applicator roll 18 and a doctor roll 19. An adhesive pan 20 is positioned below the applicator roll 18 so that the height of the adhesive 21 surface is above the lower chord portions of the applicator roll 18. As the applicator roll surface emerges from the adhesive pond with a clinging film of adhesive, the film is delivered into a measured metering space 17 between the applicator roll surface and the counter-rotating surface of the doctor roll 19. This metering space 17 screeds the film thickness carried by the applicator roll 18 into wiping contact with the medium flute tips held against the roll 11 surface.

A liner web B is routed into surface contact with a pressure roll 14 and into the nip 13 between the corrugating roll 11 and a pressure roll 14. Within the nip 13, the adhesive coated flute tips of the corrugated medium A are laminated to the liner B. The adhesive bond between the liner B and the medium flute tips is almost instantly set by heat and pressure of the nip. Thus, a continuum of single faced board is produced and routed forward to additional converting equipment such as a double backer that applies a second facing web or liner.

Figure 2:
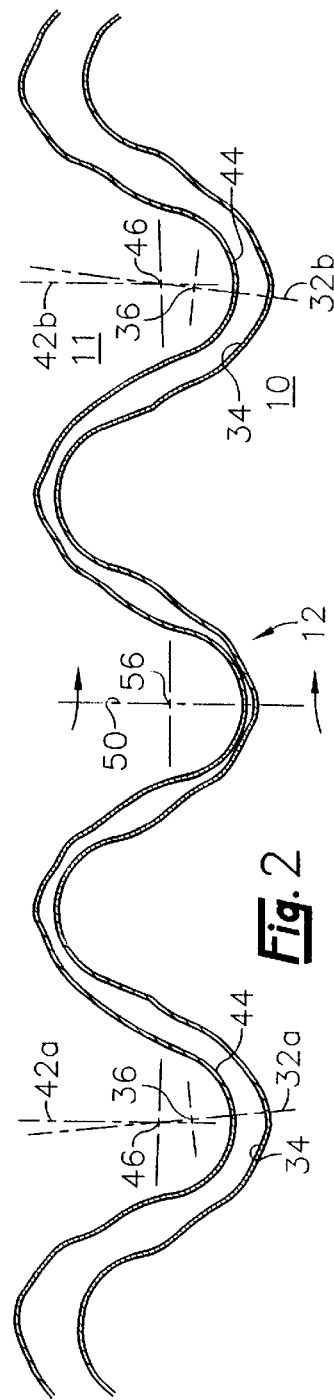
FIG. 2 is an enlarged cross-sectional profile of a meshing pair of corrugating rolls according to the present invention.

With respect to FIG. 2, an enlarged profile of the nip 12 is shown between corrugating rolls 10 and 11. The flute tips 44 of roll 11 are shown as advancing into and withdrawing from the flute valleys 34 of roll 10. The flute valleys 34 are substantially symmetric about valley radius planes 32 that radiate from the roll axis 30. The flute tips 44 of roll 11 are substantially symmetric about radius planes 42 that radiate from the roll axis 40. Each tip surface profile is a circular arc about an axis 46 that is located in the tip radius plane 42. Each valley base surface profile is basically, but not entirely, a radial arc about an axis 36 that is located in the valley radius plane 32. Viewing FIG. 2 dynamically, the valley radius plane 32a is skewed to the tip radius plane 42a upon rotational approach to the axial plane 50. Accordingly, the valley base arc axis 36 is displaced from the tip arc axis 46. When a valley radius plane 32 rotates into a planer coincidence with a tip radius plane 42 there is substantial planar coincidence with the axial plane 50 passing through both roll rotational axes 30 and 40 and substantial axial coincidence of arc axes 36 and 46 along a mutual arc axis 56. As roll rotation continues past the axial plane 50, the arc centers 36 and 46 separate and the radius planes 32b and 42b angularly diverge.

Figure 3:
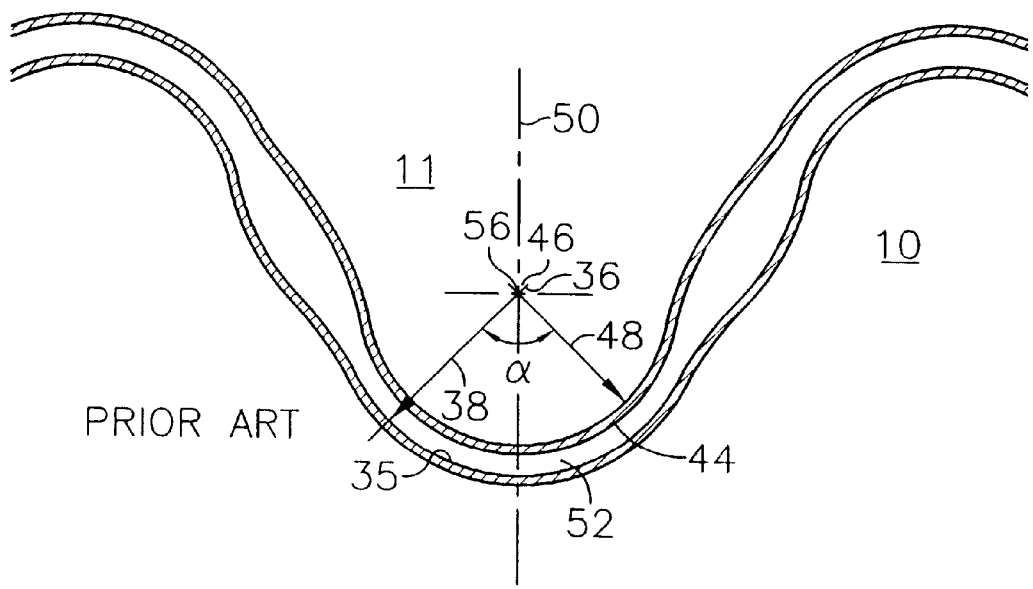
FIG. 3 illustrates a prior art corrugating roll flute profile with a powdered metal hard-face coating.

Referring now to the prior art illustration of FIG. 3, a roll 11 flute tip 44 is shown in symmetric alignment with a prior art valley 35. The flute tip 44 has a circular arc profile defined by radius 48 turned about a center 46 through an arc α. The profile of valley 35 is substantially the circular arc of a radius 38 turned about the center 36 over an angle α. When the arc axis 36 of valley 35 rotates into coincidence with the axial plane 50, axial coincidence also occurs with the arc axis 46 of flute tips 44. At this position of axial plane coincidence, axis 56 is a mutual axis for both flute arcs. The arc α about the axis 56 may range from about 45 degrees to about 75 degrees. Over this arc α, the surface profiles of tip 44 and valley 35 are substantially concentric. Also concentric is the annular space 52 between the respective tip and valley surfaces. The radial thickness of this space 52 is about 20 to 40 percent less than the caliper of the medium web to be nipped therebetween.

Figure 4:
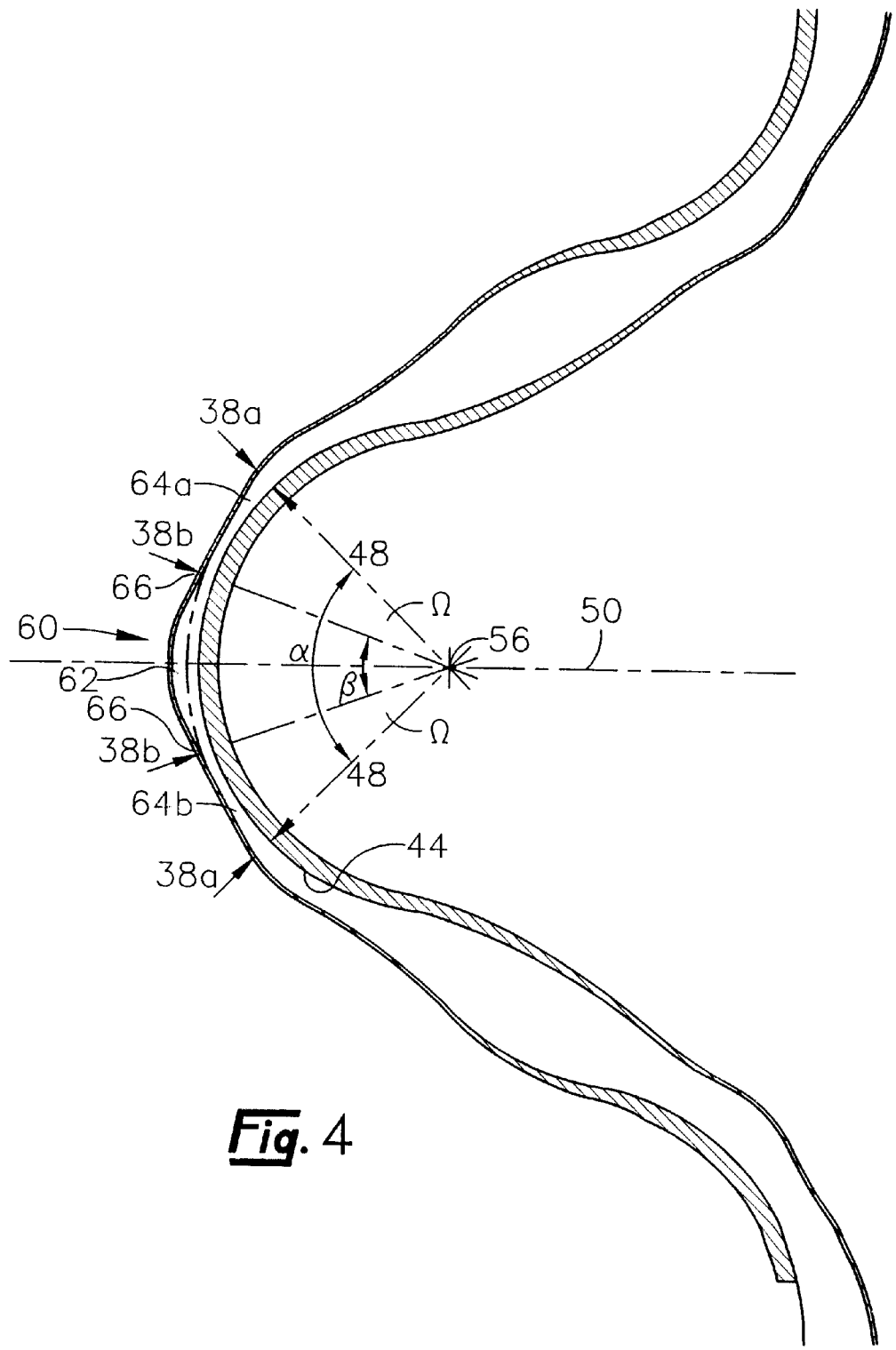
FIG. 4 is a corrugating roll flute profile according to the present invention having an electroplated hard-face coating.

In contrast to the prior art profile of FIG. 3, reference is now directed to the invention flute profile of FIG. 4. With respect to flute tip surfaces 44, the profile remains substantially the same as the prior art. A tip radius 48 is rotated about a mutual arc center 56 over an arc α that may span from 45 to 90 degrees, preferably about 60 degrees.

The flute valley profile 60 of FIG. 4, however, includes a pair of parallel arcuate strips 64a and 64b. These strips 64a and 64b are aligned substantially equidistant from the axial plane 50 and are bounded between the radial planes 38a and 38b. These radial planes 38a and 38b are angularly separated by respective arcs Ω. An included angular arc β separates the radial planes 38b on opposite sides of the axial plane 50. Within this arc β, a channel or trough 62 is formed into the valley base profile 60 to radially offset the valley base surface from the tip surface by distance that exceeds a fiber compressing engagement proximity. Depending on the web thickness and the flute size, the depth of channel 62 may be as little as 0.001 inches greater than the valley arc radius 38. For the production of C-flute board with 9 point (0.009 in.) corrugating medium, a channel depth of about 0.005 inches, for example, may be preferred.

Figure 5:
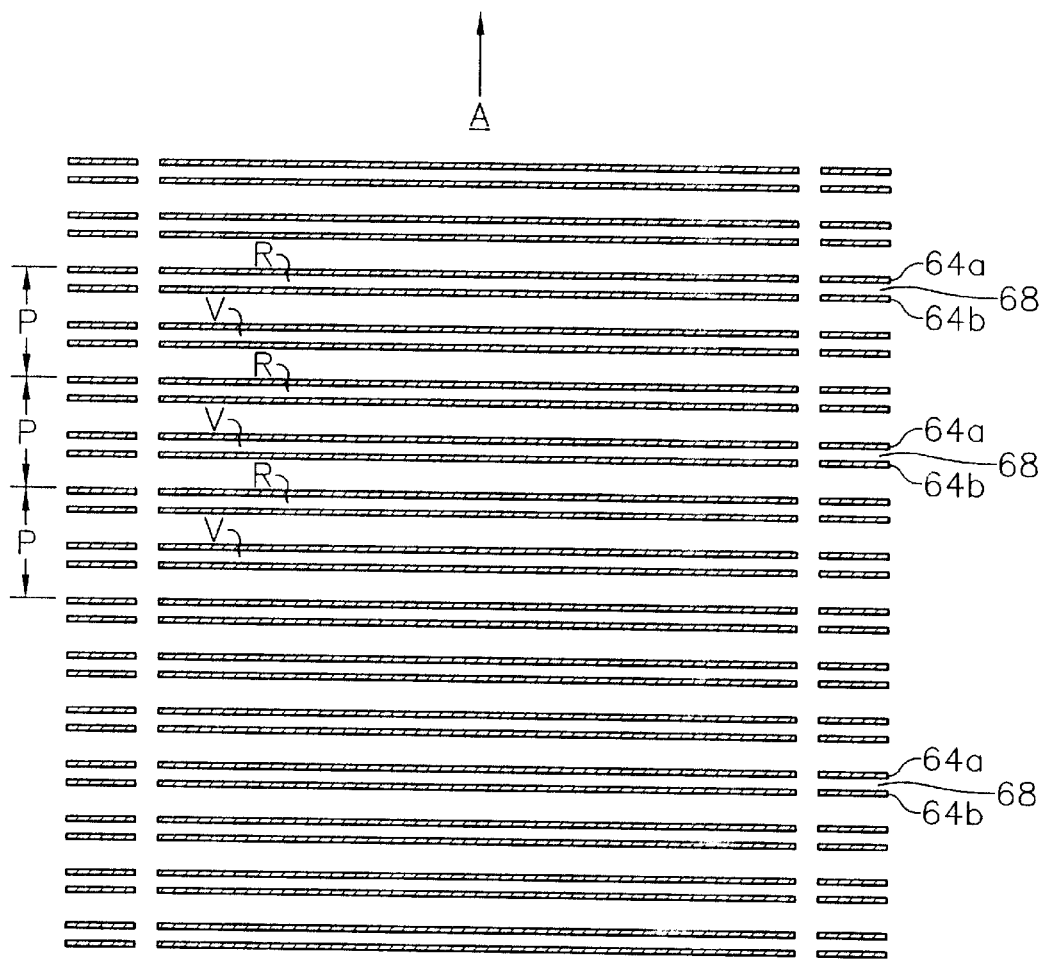
FIG. 5 is a corrugating nip continuum of the present invention applied to a medium web.

The corrugated medium product of this channeled valley structure is illustrated by the nip pattern of FIG. 5. Each of the dark strips represents a line area of fiber compressive nip pressure between the meshing flutes of a pair of corrugating rolls. A pair of nip line areas 64a and 64b are separated by an apexial area or strip 68 of less compressed fiber. However, the pair of nip lines 64a and 64b, including the less compressed strip 68 therebetween, constitutes one flute tip in the serial continuum of corrugated medium. Alternating tips along that continuum are oppositely oriented. Accordingly, each flute period P comprises one tip R and one valley V. Correspondingly, each flute period comprises 2 line areas (apexial) of less compressed fiber 68 and 4 line areas of more compressed fiber.

The area ratio of less compressed fiber 68 to the more compressed fiber 64 within a flute tip line may range from about 10 percent to about 50 percent depending on the flute size and medium caliper. A preferred embodiment of the invention has been produced with about 25 percent of the tip area devoted to the less compressed apexial area 68 and about 37.5 percent devoted to each of the more compressed fiber line areas 64a and 64b. The less compressed strip area 68 generally relates to the arc β of FIG. 4 that is delineated between the radii 38b which define the boundaries 66 of the valley channel 62. The lines of more compressed fiber 64a and 64b generally translate to the arcs Ω delineated by respective pairs of radial planes 38a and 38b. Hence, the channel arc β may be from about 10 percent to about 50 percent of the overall arc α. Preferably, arc β is about 25 percent of the arc α with the remaining 75 percent distributed substantially equally to opposite sides of the axial plane 50.

With further reference to FIG. 4, it will be noted that the valley channel or trough boundaries 66 provide a faired, convex surface confluence between the recess of channel 62 and the radial arc valley surfaces between radial planes 38a and 38b. It has been noted that an approximately 10 percent increase in electroplate thickness has been achieved in the region of these channel boundaries 66.

Figure 6:
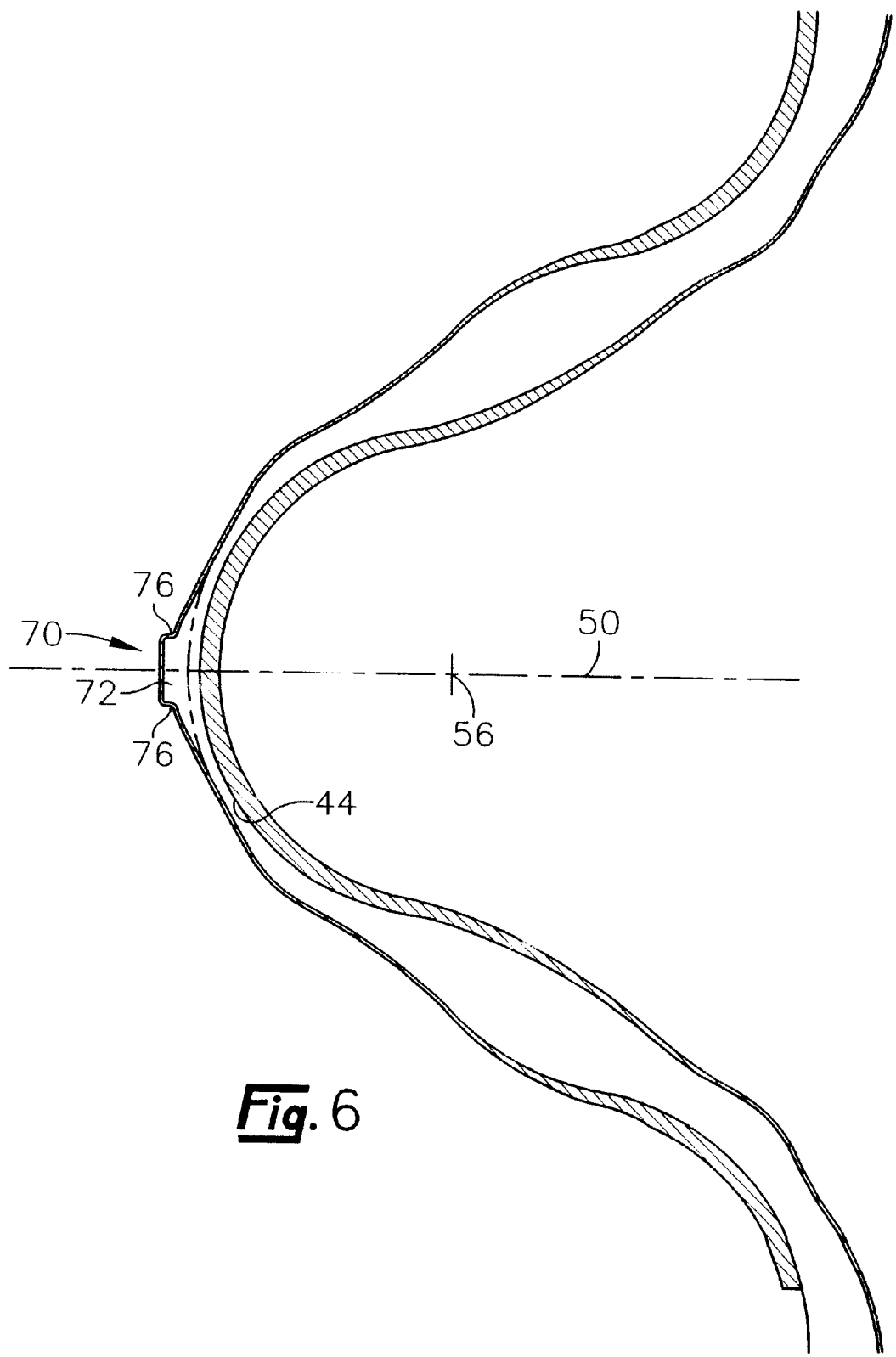
FIG. 6 is an enlarged illustration of an alternative embodiment of the invention.

Turning next to an alternative embodiment of the invention shown by FIG. 6, the valley profile 70 may also be given a substantially flat bottom for a substantially rectangular trough 72. By "flat bottom", it is contemplated that the trough floor is substantially perpendicular to the valley radius of symmetry. In this case, the valley trough boundaries 76 may be faired into the valley arc with a smaller boundary radius.

Figure 7:
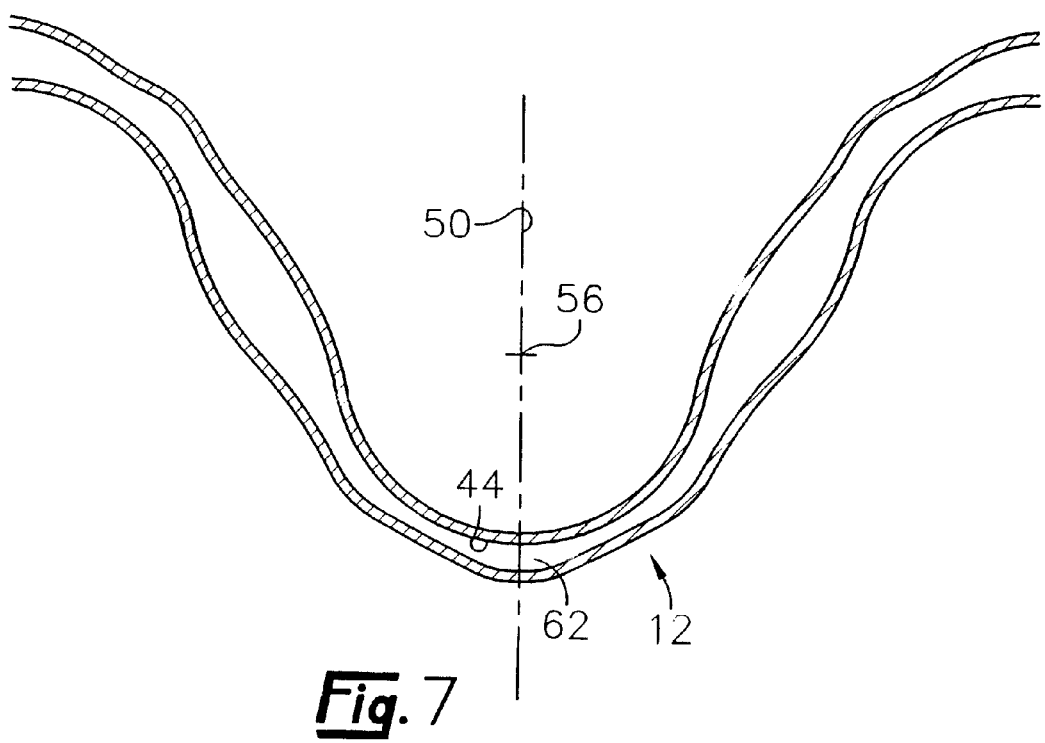
FIG. 7 is a corrugating roll flute profile according to the present invention having a powdered metal hard-face coating; and, FIG. 8 is an enlarged section of double-faced paperboard formed according to the invention.

Although the increased electroplate deposition result along the valley channel boundaries of this invention is a bonus consequence, it will be noted with respect to FIG. 7 that powder applied hard facing provides a uniform deposition thickness in either case. Nevertheless, because the nip area along the axial plane 50 is most abrasive to the flute tips and valleys, substantially extended operational life for a corrugating roll pair may be obtained by the invention. The narrow valley channel along the axial plane seems to relieve the destructively abrasive pressure between the two meshing roll surfaces at the most critical point. The medium web corrugation profile, however, is unaffected by the less compressed line 58. Hence, the product strength qualities are improved by a reduced area of greatly compressed fiber.

Figure 8:
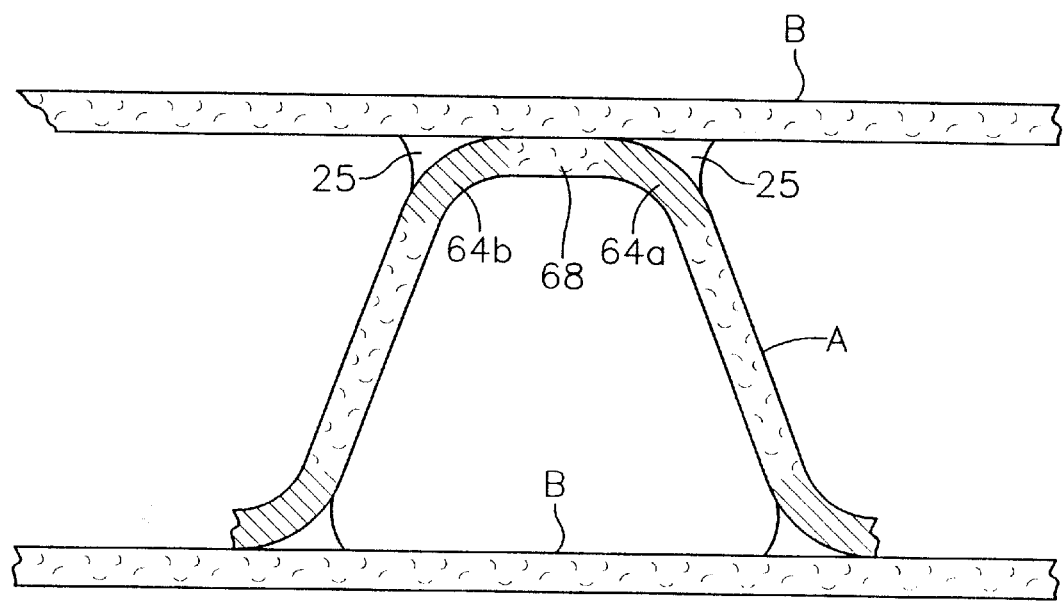

One consequence of a less compressed area along the medium flute tips is a deeper and more rapid penetration of adhesive into the medium. With respect to the double-faced board enlargement of FIG. 8, the less compressed fiber structure along the apexial areas 68 is more responsive to the absorption and wicking dynamics of the viscous adhesive 25 than the more densely compressed areas 64a and 64b. In the brief interval allowed by adhesive application in the wiping nip between the application roll 18 and the medium flute tips, the less compressed medium fiber in area 68 allows a deeper, more saturating penetration by the adhesive 25a. This deeper penetration contributes to a stronger bond between the medium flute tip and the adjacent liner board B. Moreover, areas 64a and 64b, being compressed to a somewhat greater degree, contribute to improved compressive strength of the overall structure against forces applied normal or near normal to the plane or planes of the liner board or boards.

As a traditional or prior art flute profile wears, roll material loss is compensated by an adjusted reduction in the separation distance setting between the roll axes 30 and 40 to sustain the flute tip forming compression of the medium fiber. As such compensation and adjustment is continued and repeated, the flute period remains constant but the flute amplitude shrinks. It is the flute amplitude that determines the face-to-face thickness of the finished, corrugated board product. This face-to-face thickness of the finished board is characterized by the art nomenclature as the board caliper. Regulated board standards specify the limits of acceptable board caliper corresponding to a given flute size or category. Board caliper loss due to flute wear has two adverse consequences, therefore. First, the board caliper shrinks below an acceptable sale or contract specification. Secondly, because of the reduced separation distance between the board facing sheets, the board bending moment is reduced i.e., the board bending strength is reduced.

When applied to the present invention, roll material wear occurs along the valley channel boundaries 66 or 76. This type of wear expands the compressed fiber zones 64a and 64b into the intermediate zone 68. The flute amplitude, however, remains substantially the same until the flute tips begin to engage and wear the valley material along the radius of symmetry. Early experience with the invention suggests that this wear sequence may extend the original production cycle of a new corrugating roll by as much as 20% before reconditioning is required by unacceptable board caliper.

Although the subsequent production cycles of the reconditioned roll are substantially the same as for prior art rolls, the 20% cycle life extension from the initial production cycle provides a significant economic advantage to the full life cycle of a roll.

The foregoing description of my preferred invention embodiments has been presented for purposes of illustration and description. It is not intended to be exhaustive or to limit the invention to the precise forms disclosed. Obvious modifications or variations are possible in light of the above teachings. These embodiments were chosen and described to provide the best illustrations of the principles of the invention and its practical application and to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

As my invention, therefore,

I claim:

1. A corrugating roll for forming paperboard corrugating medium, said roll having a rotational axis and comprising undulating surface comprising alternating tips and valleys extending substantially parallel with a said rotational axis, each of said valleys having a valley base surface along a radial plane of symmetry between laterally flanking flute tips, a relatively narrow trough in said valley base surface having substantially parallel trough boundaries on opposite sides of said radial plane of symmetry, said valley base surface further comprising a substantially parallel pair of concave radial arcs along opposite side boundaries of said trough, said opposite side boundaries of said trough having a faired, convex surface transition from trough sidewalls into confluence with said parallel radial arcs.

2. A corrugating roll as described by claim 1 wherein a floor surface of said trough is substantially normal to said radial plane of symmetry.

3. A corrugating roll as described by claim 1 wherein said trough is greater than about 0.001 in. deep into said valley base.

4. A corrugating machine for forming corrugating paperboard medium, said machine comprising a pair of corrugating rolls with meshing surface flutes comprising alternating tips and valleys, opposing surfaces of a flute tip on one roll and a flute valley on a cooperative roll having a first separation distance that is less than a cooperative medium web caliper, a base surface of said flute valley having a relatively shallow channel therein to provide a second separation distance between opposite tip and valley surfaces along said channel that is greater than said first separation distance and said flute valley further comprising a substantially parallel, spaced-apart pair of concave radial arcs along opposite side walls thereof and a faired, convex surface transition from said channel into confluence with said radial arcs.

5. A corrugating machine as described by claim 4 wherein said first separation distance between said opposite tip and valley surfaces is calibrated to compress web fiber therebetween.

6. A corrugating machine as described by claim 5 wherein said valley base surface has a substantially radial arc contour extended along a radial plane of symmetry, said channel in said valley base surface being a substantially symmetric discontinuity in said radial arc contour whereby segments of said radial arc contour substantially parallel said channel on opposite sides of said plane of symmetry.

7. A corrugating machine as described by claim 6 wherein a floor surface of said channel is substantially normal to said plane of symmetry.

8. A corrugating machine as described by claim 6 wherein the discontinuity of said channel is greater than about 0.001 in.

9. In a process for producing corrugated paperboard which comprises forming from a medium web a sinusoidally fluted medium having substantially parallel, arcuate flute tips and adhesively securing the fluted medium to at least one facing web along apexial areas of the flute tips to at least one side of said medium, the improvement which comprises, in formation of said fluted medium, compressing the medium web fiber in formation of said flutes along a pair of substantially parallel line areas on immediately adjacent opposed sides of the apexial areas of said flute tips to a greater degree as compared to that of medium web fiber along said apexial areas and sidewall areas of said flutes to provide a serial continuum of fluted medium adhesively secured to said facing web along the apexial areas of said flutes having fibers compressed to a relatively lesser degree than fibers in said line areas along opposed sides of said apexial areas.

10. A process as described by claim 9 wherein the fiber within said pair of parallel line areas is compressed by a nip between rotatively meshing flute tip and valley surfaces, a nip separation distance between said meshing surfaces being greater than about 60% of the medium caliper.

11. A process as described by claim 9 wherein the apexial areas are about 10% to about 50% of area between and inclusive of said parallel line areas of more compressed fiber.

12. A process as described by claim 11 wherein said apexial areas are less than about 25% of that the parallel line areas of more compressed fiber.

13. A process as described by claim 12 wherein the areas of said parallel line areas of more compressed fiber are substantially equal.

14. A corrugated paperboard product comprising an undulating paper medium having periodically alternating flute tips and flute valleys connected by sidewall areas, at least one substantially undeformed facing sheet adhesively bonded to flute tips respective to one side of said undulating paper medium, said flute tips comprising an arc about a radial plane of symmetry, the paper medium constituency within the arc of said flute tips and said sidewall areas being relatively less compressed along a strip including said radial plane of symmetry as compared to a pair of strips respectively flanking said less compressed strip and substantially within said arc.

15. A corrugated paperboard product as described by claim 14 wherein paper medium area respective to said less compressed strip is about 10% to about 50% of the total medium area inclusive of said more compressed flanking strips.

16. A corrugated paperboard product as described by claim 14 wherein paper medium area respective to said less compressed strip is about 25% of the total medium area inclusive of said more compressed flanking strips.

* * * * *